F. L. WALTER.
INDICATOR FOR AMPLIFYING GAUGES AND THE LIKE.
APPLICATION FILED JULY 19, 1920.

1,431,999.

Patented Oct. 17, 1922.

INVENTOR.
FRANK L. WALTER
BY
ATTORNEY

Patented Oct. 17, 1922.

1,431,999

UNITED STATES PATENT OFFICE.

FRANK L. WALTER, OF DAYTON, OHIO.

INDICATOR FOR AMPLIFYING GAUGES AND THE LIKE.

Application filed July 19, 1920. Serial No. 397,392.

*To all whom it may concern:*

Be it known that I, FRANK L. WALTER, a citizen of the United States, residing at Dayton, in the county of Montgomery and State of Ohio, have invented certain new and useful Improvements in an Indicator for Amplifying Gauges and the like, of which the following is a specification, reference being had therein to the accompanying drawing.

This invention relates to an indicator for amplifying gauges and the like.

The indicators for amplifying gauges, which are used for gauging work which must conform to very fine limits of variation, are usually calibrated on the opposite sides of the zero point to the extreme limit of the gauge, as for example, .005 of an inch and contain between the zero mark and the extreme limits a plurality of fine division marks. In operating a gauge of this character to gauge work the tolerance for which is, say for example, plus or minus .001, it is necessary for the operator upon each operation of the gauge to select from this multiplicity of marks the one representing the limit of his tolerance. Because of the fineness of the marks and the number thereof, this renders the operation rather slow and even when care is used there is an opportunity for error due to a mistake in reading the graduations on the indicator.

The object of the present invention is to provide an indicator of this kind comprising a dial having a group or groups of graduations, each consisting only of the zero mark and two marks arranged on opposite sides of the zero mark, and representing the limits of the tolerance for that group of graduations, say for example, plus or minus .001 of an inch, and having means whereby this group of graduations, or a selected group of graduations, where there are several, may be moved into and out of operative position with relation to the needle, or other indicating member, thus enabling the operator to set his indicator according to his tolerances and to determine the reading at a glance, because of the absence of a multiplicity of the markings or graduations.

It is also an object of the invention to provide such an indicator which will be very simple in its construction and operation and in which all the graduations except the particular group which is in operative position will be concealed from view.

Other objects of the invention will appear as the device is described in detail.

Figure 1:
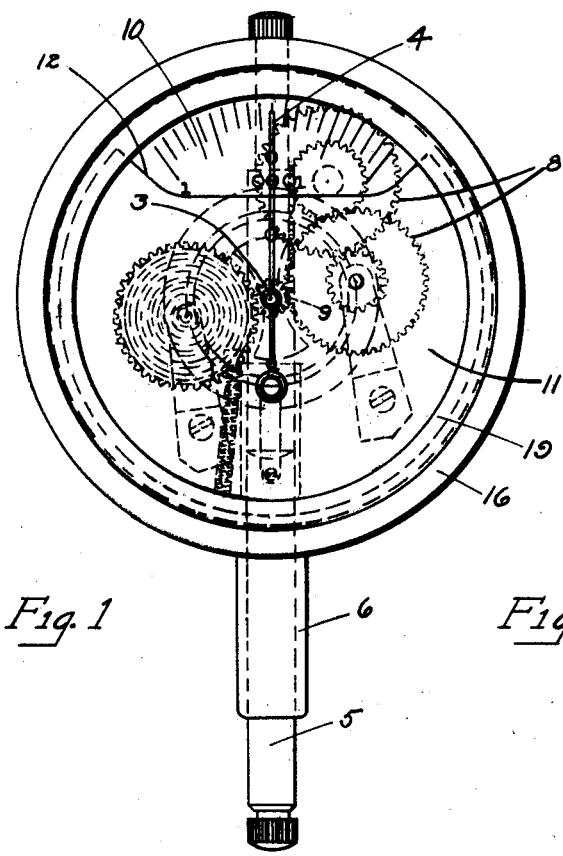
Figure 2:
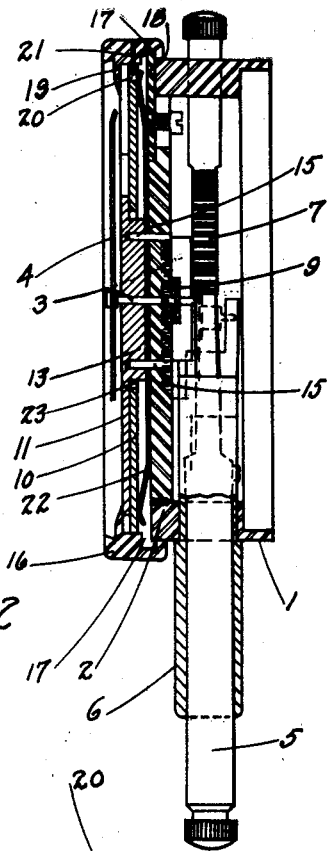
Figure 3:
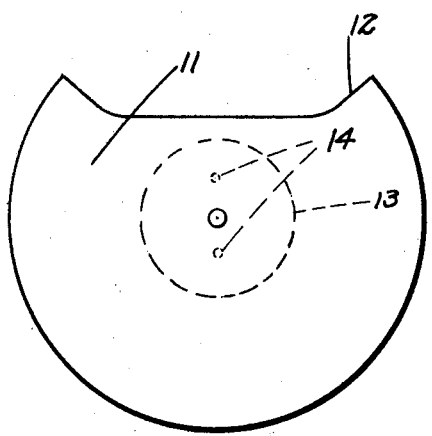
Figures 4, 5:
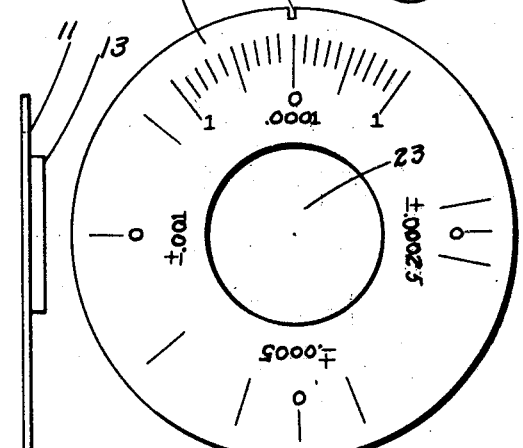

In the accompanying drawings Fig. 1 is a front elevation of an indicator embodying the invention; Fig. 2 is a vertical sectional view taken centrally through such an indicator; Fig. 3 is a detail view of the shield; Fig. 4 is an edge view of the shield; and Fig. 5 is a detail view of the dial.

In these drawings I have illustrated one embodiment of my invention and have shown the same as applied to an indicator, the main features of construction of which are well known and need not be here described in detail. This indicator comprises a casing 1 preferably cylindrical in shape and having a front wall, or face plate, 2. Journaled in this wall is a shaft 3 on the outer end of which is mounted the indicating member, or needle 4. The inner end of the shaft is operatively connected with an actuating member which is here shown as a plunger 5 slidably mounted in the wall of the casing and in the present instance mounted in a tubular standard 6 by means of which the indicator as a whole may be mounted on a suitable support. The plunger 5 is provided within the casing with an extension in the form of a toothed rack 7 which is connected through a train of gears 8 with a pinion 9 secured to the shaft 3. The actuating member, or plunger, 5 may constitute the work engaging member, but usually this plunger is arranged in operative relation to the operating mechanism of an amplifying gauge and the mechanism as a whole is of such a character that the needle will indicate the amount of movement of the work engaging member.

In applying my invention to this indicator I have provided a dial 10 having thereon a plurality of groups of graduations, these graduations being in the present instance mounted on a single circular dial and being spaced about the circumference thereof. The graduations may be arranged in any suitable manner and may represent any desired tolerance but in the form here illustrated the dial has thereon four groups of indications, three of which consist of three marks only, that is the zero mark and a mark arranged on each side of the zero mark to represent respectively the plus and minus limits of variation. In the present construction these three groups of graduations are arranged to represent tolerances plus and minus .001, plus and minus .0005, and plus and minus .00025. The fourth group of graduations is also for plus and minus .001 tolerance but it is provided between the zero mark and the extreme outer marks with the finer division marks which will enable the exact amount of variation to be determined, this particular group of graduations being provided for the use of tool makers or others where the tolerances vary and the exact variations are to be determined. This dial is rotatably mounted between the face plate 2 of the casing of the indicator and the needle 4 so that the needle will travel over the face of the dial. The dial is adjustable, preferably about a central axis, to enable the same to be adjusted to move a selected group of graduations into operative position. In the present construction, the operative position is at the top of the indicator and in order that only that group of graduations which is in operative position may be visible, I have inserted in front of the dial a shield 11 having its upper portion cut away to provide a recess 12 of such a size that the largest group of graduations will be visible through the same when set to operative position. This shield is connected with a fixed part of the casing in such a manner that it is held against rotation with the dial, and, as here shown, it has a thickened central, or hub, portion 13 through which the shaft 3 extends and which is provided in its inner face with holes 14 to receive pins 15 carried by the face plate 2 of the casing. Rotation may be imparted to the dial in any suitable manner and, in the present construction, I have shown the same as having a central opening 23 to receive the hub portion 13 of the shield and as carried by an annular supporting member 16 which is rotatably mounted upon the forward portion of the casing 1 and is here shown as having an internal circumferential groove 17 into which project lugs 18 carried by the casing and which serve to rotatably support the annular member on the casing. One or more of these lugs is movably mounted on the casing to permit the end of the same to be moved into the groove 17 after the annular member has been placed in position on the casing. The annular member is provided with an inwardly extending annular flage, or bezel, 19, which overlaps the edges of the dial and of the shield. The dial may be attached to the annular supporting member in any suitable manner, but, as here shown, it has in its periphery a recess 20 into which extends the end of a pin 21 mounted in the annular member. A suitable friction device is applied to the dial to hold the same against accidental displacement and, as here shown, this friction member is in the form of a resilient plate 22 mounted on the face plate 2 of the casing and having curved fingers which bear against the rear surface of the dial to press the same against the shield 11 which in turn bears against the flange, or bezel, 19 of the annular supporting member.

When the indicator is to be used the annular supporting member 16 is rotated, thereby rotating the dial, to bring the selected group of graduations into line with the opening 12 in the shield. The indicator as a whole is then adjusted relatively to its support to cause the needle 4 to register zero when the work engaging member is in contact with the master gauge. When a piece of work to be gauged is then placed in engagement with the work engaging member, the needle will indicate any variation from the master gauge. If the work is larger than the gauge the needle will be shifted to one side of zero and if the work is smaller than the gauge it will be shifted to the other side of zero, but inasmuch as there are two marks only to be considered, one on each side of the zero position, the reading can be made at a glance, there being no intermediate marks, or graduations, to cause confusion or uncertainty. The device is very simple in its construction and operation and while I have shown and described one embodiment of the invention I wish it to be understood that I do not desire to be limited to the details thereof as various modifications may occur to a person skilled in the art.

Having now fully described my invention what I claim as new and desire to secure by Letters Patent, is:

1. In an indicator of the character described, a supporting structure, a normally stationary flat dial mounted on said structure for adjustment about an axis extending transversely to the plane thereof and having a plurality of groups of graduations arranged concentrically of said axis, a device for adjusting said dial about said axis to move a selected group of graduations into operative position, an indicating member mounted for movement over the graduations of said selected group, and means for actuating said indicating member.

2. In an indicator of the character described, a normally stationary flat dial adjustable about an axis extending transversely to the plane thereof and having a plurality of groups of graduations arranged concentrically to its axis, a shield mounted in front of said dial, held against rotation therewith, and having an opening to expose to view a single group of said graduations, an indicating member movable over the graduations which are in line with said opening, and means for actuating said indicating member.

3. In an indicator of the character described, a supporting structure, a normally stationary flat dial mounted on said structure for adjustment about an axis extending transversely to the plane thereof and having a plurality of groups of graduations arranged concentrically of said axis, a shield mounted in front of said dial, held against rotation therewith and having an opening arranged to expose to view a single group of said graduations, an annular member rotatably mounted on said structure and connected with said dial for adjusting the same to move a selected group of graduations into line with said opening, an indicating member mounted for movement over the graduations which are in line with said opening, and means for actuating said indicating member.

4. In an indicator of the character described, a supporting structure, a normally stationary flat dial mounted on said structure and having on its face a plurality of groups of indications, a shield mounted in a fixed position on said structure and having an opening to exhibit a single group of said indications, said dial being adjustable to position any selected group of indications in line with said opening, a needle arranged to travel over the indications which are in line with said opening, and means to actuate said needle.

5. In an indicator of the character described, a supporting structure, a normally stationary flat dial mounted on said structure and having on its face a plurality of groups of indications and adjustable about an axis transverse to its face to move a selected group of indications into operative position, a fixed shield mounted on said structure and having an opening arranged to exhibit that group of indications which is in an operative position, a needle mounted on an axis parallel with the axis of said dial and arranged to move over the indications of that group which is in operative position, and means to actuate said needle.

6. In an indicator of the character described, a casing, an annular member rotatably mounted on said casing, a dial carried by said annular member and having a plurality of groups of graduations, a shield mounted within said annular member in front of said dial and connected with said casing, said shield having an opening to expose to view a single group of graduations, an indicating member movable over the graduations in line with said opening, and means for actuating said indicating member.

7. In an indicator of the character described, a casing having a face plate, a shield secured to said casing and spaced therefrom, said shield having a hub portion and having a recess in the edge thereof, a member rotatably mounted on said casing, a dial carried by said rotatable member and interposed between said shield and said face plate, a shaft journaled in said face plate and extended through the hub of said shield, a needle carried by said shaft, and means for rotating said shaft.

8. In an indicator of the character described, a normally stationary flat dial mounted for adjustment about an axis transverse to its face and having on the face thereof a plurality of groups of graduations, each consisting only of a zero mark and two limitation marks on the respective sides of said zero mark, a fixed shield supported in front of said dial and having an opening to expose to view a single group of said graduations, an indicating member mounted for movement over the graduations of the group which is in line with said opening, and means for actuating said indicating member.

9. In an indicator of the character described, a normally stationary flat dial mounted for adjustment about an axis transverse to its face and having thereon a group of graduations consisting only of a zero mark and two limitation marks on the respective sides of said zero mark, means to move said group of graduations into an operative position, an indicating member mounted for movement over said graduations when they are in operative position, and means for actuating said indicating member.

In testimony whereof, I affix my signature hereto.

FRANK L. WALTER.